(12) United States Patent
Park et al.

(10) Patent No.: US 7,875,320 B2
(45) Date of Patent: Jan. 25, 2011

(54) METHOD FOR PRODUCING FILM OF VANADIUM PENTOXIDE NANOWIRES HAVING IMPROVED ALIGNMENT AND VANADIUM PENTOXIDE NANOWIRE FILM PRODUCED THEREBY

(75) Inventors: Jae-Hyun Park, Ulsan (KR); Jeong-Sook Ha, Seoul (KR); Yong-Kwan Kim, Seoul (KR)

(73) Assignee: Korea University Industry and Academy Cooperation Foundation (KR)

( * ) Notice: Subject to any disclaimer, the term of this patent is extended or adjusted under 35 U.S.C. 154(b) by 470 days.

(21) Appl. No.: 12/029,596

(22) Filed: Feb. 12, 2008

(65) Prior Publication Data

US 2009/0162272 A1  Jun. 25, 2009

(30) Foreign Application Priority Data

Dec. 24, 2007  (KR) .................... 10-2007-0136928

(51) Int. Cl.
  *B05D 1/18* (2006.01)
(52) U.S. Cl. .................... 427/430.1; 977/890; 977/892
(58) Field of Classification Search ............... 427/430.1
  See application file for complete search history.

(56) References Cited

FOREIGN PATENT DOCUMENTS

| KR | 10 2007 0037484 | 4/2007 |
| KR | 10 2007 .112733 | 11/2007 |
| KR | 10 2006 0130474 | 2/2008 |

OTHER PUBLICATIONS

Park et al. Thickness and density controllable pattern transfer of DODAB/V2O5 nanowire hybrid film. Nanotechnology 18 (2007), published online Sep. 11, 2007. pp. 1-6.*

Park et al. Controlling orientation of V2O5 nanowires within micropatterns via microcontact printing combined with the gluing Langmuir-Blodgett technique,Nanotechnology 19 (2008), published online Aug. 8, 2008. pp. 1-6.*

Yamaki et al. Alternative Multilayer Deposition from Ammonium Amphiphiles and Titanium Dioxide Crystalline Nanosheets Using the Lanmuir Blodgett Technique, Langmuir 2001, 17, 2564-2567.*

Ahn et al., "Heterogeneous Three-Dimensional Electronics by Use of Printed Semiconductor Nanomaterials," *Science*, 2006, pp. 1754-1757, vol. 314, www.sciencemag.org.

Kang et al., "High-Performance Electronics Using Dense, Perfectly Aligned Arrays of Single-Walled Carbon Nanotubes," 2007, *Nanturenanotechnology*, pp. 230-236, vol. 2, www.nature.com/naturenanotechnology.

\* cited by examiner

*Primary Examiner*—David Turocy
(74) *Attorney, Agent, or Firm*—Alston & Bird LLP

(57) ABSTRACT

A method for producing a film of vanadium pentoxide nanowires having improved alignment is provided. The method comprises the steps of a) preparing a solution of vanadium pentoxide ($V_2O_5$) nanowires by a sol-gel method; b) diluting the solution of vanadium pentoxide nanowires with water and feeding the dilute aqueous solution into a Langmuir-Blodgett trough; c) adding a dispersant to the dilute aqueous solution of vanadium pentoxide nanowires; d) diluting a solution of a dioctadecyldimethylammonium halide with an organic solvent, applying the dioctadecyldimethylammonium halide solution to the surface of the dilute aqueous solution of vanadium pentoxide nanowires in the Langmuir-Blodgett trough, and allowing the solutions to stand to disperse the dioctadecyldimethylammonium halide solution in the Langmuir-Blodgett trough; e) controlling the surface pressure of the dioctadecyldimethylammonium halide solution using barriers mounted on the Langmuir-Blodgett trough; f) affixing a substrate to a dipping arm of the Langmuir-Blodgett trough and bringing the substrate into contact with the surface of the dioctadecyldimethylammonium halide solution; and g) separating the substrate from the dipping arm.

19 Claims, 16 Drawing Sheets

Θ: Angle of alignment
of nanowires in pattern

METHOD FOR PRODUCING FILM OF VANADIUM PENTOXIDE NANOWIRES HAVING IMPROVED ALIGNMENT AND VANADIUM PENTOXIDE NANOWIRE FILM PRODUCED THEREBY

CROSS-REFERENCE TO RELATED APPLICATIONS

The present application claims priority to Korean Patent Application No. 10-2007-0136928, filed Dec. 24, 2007, which is incorporated herein by reference in its entirety.

FIELD OF THE INVENTION

The present invention relates to a method for producing a film of vanadium pentoxide ($V_2O_5$) nanowires having improved alignment and a vanadium pentoxide nanowire film produced by the method. More particularly, the present invention relates to: a method for producing a film of vanadium pentoxide ($V_2O_5$) nanowires using sol-gel synthesis by which the alignment of the nanowires can be markedly improved, the need for subsequent washing can be eliminated, which contributes to the simplification of the production process, and the nanowires can be cut to desired lengths in a simple manner, thereby ensuring the reproducibility of a device using the nanowire film and achieving improved characteristics of the device; and a vanadium pentoxide nanowire film produced by the method.

BACKGROUND OF THE INVENTION

A major purpose of conventional patterning techniques of nanowires is to position the nanowires at desired locations. However, conventional patterning techniques use indefinite nanowire networks, thus causing damage to the stability of nanowire devices fabricated using the nanowires. Under these circumstances, recent studies on the patterning of nanowires have focus on the alignment of the nanowires as well as the control over the location of the nanowires. Various processes have been developed to date for patterning nanowires. Of these, a great deal of research has been conducted on printing processes by which nanowires can be patterned over a large area in an economically feasible and simple manner. Studies on the patterning of nanostructures using printing-transfer processes developed hitherto are broadly classified into two types.

The first type of studies have focused on the patterning of nanowires in order to induce selective adsorption of the nanostructures on a surface having not only an affinity but also a repulsive interaction with the nanowires using a printing process. To this end, a substrate is patterned with different functional groups, and then the patterned substrate is exposed to nanowires so as to allow the nanowires to be selectively adsorbed to the intended locations, which are pre-designed for the attachment of the nanowires, of the substrate (Korean Patent Publication No. 10-2007-0112733). This process employs a self-assembly method, but has many difficulties in processing a multilayer of nanowires rather than patterning a monolayer of nanowires and the procedure is also complicated.

The second type of studies relate to the patterning of nanowires by transferring nanowires to a stamp and printing a pattern of the nanowires on a substrate. These second type of studies can be achieved by the following techniques. The first technique is to transfer nanostructures produced on a substrate to a stamp using a known semiconductor manufacturing process and to transfer the nanostructures on the stamp to another substrate where a nanowire device is to be fabricated by printing (*Science* 314, 1754 (2006), Korean Patent Publication No. 10-2007-0037484). The second technique is to align and grow nanowires, transfer the grown nanowires to a stamp, and print the pattern of the nanowires on a substrate (*Nature Nanotech.* 2, 230 (2007)). The third technique is to align nanowires in a solution state using a flow of fluid or tension and to transfer the aligned nanowires to a substrate by direct transfer or printing.

Most of the techniques for nanowire synthesis developed hitherto can be largely divided into two types of techniques: i.e. techniques using sol-gel synthesis in a solution state and chemical vapor deposition. The sol-gel synthesis is superior to chemical vapor deposition from the viewpoint of mass production and economic efficiency. The aforementioned first and second techniques associated with direct transfer processes cannot use nanowires produced by sol-gel synthesis. Further, these techniques are dependent on known semiconductor manufacturing processes, incurring considerable production costs. The third technique is effective in aligning various kinds of nanowires over a large area, but is not suitable for controlling the location and length of nanowires.

Meanwhile, vanadium pentoxide ($V_2O_5$) particles can be used as active materials for secondary batteries due to their high electrochemical activity. Nanometer-sized vanadium pentoxide can find application in various fields, including catalysts, electrochromic devices, sensors, antistatic coatings, and nanowires of semiconductor circuits. Many methods have been employed to prepare vanadium pentoxide particles. For example, vanadium pentoxide particles are prepared via thermal decomposition of ammonium vanadate ('a solid-phase method'). According to the solid-phase method, vanadium pentoxide particles are easy to prepare, but they disadvantageously are irregular in shape and are as very large as several micrometers in size. Vapor-phase synthesis is a method in which a heat source such as laser or plasma is used to prepare vanadium pentoxide particles. The vapor-phase method has a difficulty in controlling the processing steps and is economically disadvantageous. In contrast, sol-gel synthesis is a method in which nanometer-sized plate- or ribbon-like vanadium pentoxide particles are prepared using a solution (sol) of a vanadium pentoxide powder in an appropriate solvent. According to the sol-gel method, vanadium pentoxide particles are prepared in a simple and economically feasible way, and fine nanometer-sized vanadium pentoxide nanowires can be prepared. Another sol-gel method is known in which ammonium metavanadate, a specified amount of an acidic ion exchange resin and distilled water are mixed together to prepare fine nanometer-sized vanadium pentoxide nanowires.

The present inventors have succeeded in developing a method for producing a vanadium pentoxide nanowire film using a Langmuir-Blodgett trough (LB trough) (see Korean Patent Application No. 2006-130474). According to this method, a solution of vanadium pentoxide nanowires and a solution of a dioctadecyldimethylammonium halide are used to produce a uniform, high-density film of the vanadium pentoxide nanowires. However, the fabrication of a high-precision device using a highly uniform and dense film of vanadium pentoxide nanowires produced by the method requires further improvements in the characteristics and reproducibility of the device.

Thermal chemical vapor deposition (thermal CVD), RF plasma CVD, microwave plasma CVD, DC plasma CVD, modified catalyst CVD, arc discharge, laser deposition, pyrolysis and vapor-phase growth methods have been used for the preparation of nanowires. According to these methods, nanowires are grown and simultaneously aligned on substrates, or nanowires are capped and forced to be aligned by chemical adsorption using barriers of Langmuir-Blodgett systems.

However, the conventional methods have problems in that it is not easy to align nanowires, to transfer once aligned nanowires to another substrate, and to cut nanowires to desired lengths. In addition, the conventional methods are not applicable to the alignment of nanowires prepared on a large scale by sol-gel synthesis. Particularly, since chemical adsorption techniques using capping materials may greatly affect the electrical properties of nanowires and depend on physical forces of barriers, they have limitations in that nanowires must have a large diameter, a specific rigidity, high aspect ratio, etc.

SUMMARY OF THE INVENTION

It is a first object of the present invention to provide a method for producing a film of vanadium pentoxide nanowires using sol-gel synthesis by which the alignment of the nanowires can be markedly improved, the need for subsequent washing can be eliminated, which contributes to the simplification of the production process, and the nanowires can be cut to desired lengths in a simple manner.

It is a second object of the present invention to provide a film of vanadium pentoxide nanowires with improved alignment, which is produced by the method that exhibits excellent characteristics and reproducibility and has widespread applications as a material for field effect transistors and a variety of sensors.

According to the present invention, the first object can be accomplished by the provision of a method for producing a film of vanadium pentoxide nanowires with improved alignment, the method comprising the steps of:

a) preparing a solution of vanadium pentoxide ($V_2O_5$) nanowires by a sol-gel method, b) diluting the solution of vanadium pentoxide nanowires with water and feeding the dilute aqueous solution into a Langmuir-Blodgett trough, c) adding a dispersant to the dilute aqueous solution of vanadium pentoxide nanowires, d) diluting a solution of a dioctadecyldimethylammonium halide with an organic solvent, applying the dioctadecyldimethylammonium halide solution to the surface of the dilute aqueous solution of vanadium pentoxide nanowires in the Langmuir-Blodgett trough, and allowing the solutions to stand to disperse the dioctadecyldimethylammonium halide solution in the Langmuir-Blodgett trough, e) controlling the surface pressure of the dioctadecyldimethylammonium halide solution using barriers mounted on the Langmuir-Blodgett trough, f) affixing a substrate to a dipping arm of the Langmuir-Blodgett trough and bringing the substrate into contact with the surface of the dioctadecyldimethylammonium halide solution, and g) separating the substrate from the dipping arm.

In a preferred embodiment, the dispersant may be selected from the group consisting of ethanol, methanol, acetone, and mixtures thereof.

In a further preferred embodiment, the dispersant may be added in an amount of 0.06 to 20 parts by volume, based on 100 parts by volume of the dilute solution of vanadium pentoxide nanowires.

In another preferred embodiment, the dilute solution of vanadium pentoxide nanowires may be an aqueous solution of 1 ml of the solution of vanadium pentoxide nanowires prepared by a sol-gel method in 200 to 2,000 ml of water.

In another preferred embodiment, the dioctadecyldimethylammonium halide may be dioctadecyldimethylammonium chloride, dioctadecyldimethylammonium bromide or dioctadecyldimethylammonium iodide.

In another preferred embodiment, the organic solvent may be selected from the group consisting of chloroform, chlorobenzene, dichlorobenzene, and mixtures thereof.

In another preferred embodiment, the dilute solution of the dioctadecyldimethylammonium halide may have a concentration of 0.05 to 10 mg/ml.

In another preferred embodiment, the dioctadecyldimethylammonium halide solution may be applied using a Hamiltonian syringe.

In another preferred embodiment, the surface pressure may be adjusted to 25 to 40 mN/m.

In another preferred embodiment, the substrate may be a stamp on which a patterned polymer layer is formed.

In another preferred embodiment, the polymer may be polydimethylsiloxane.

In another preferred embodiment, the plane of the substrate may be brought into contact with the surface of the dioctadecyldimethylammonium halide solution so as to be parallel to each other.

In another preferred embodiment, the plane of the substrate may be brought into contact with the surface of the dioctadecyldimethylammonium halide solution so as to be perpendicular to each other.

In another preferred embodiment, after the substrate plane is dipped in a direction perpendicular to the surface of the dioctadecyldimethylammonium halide solution, the barriers are maximally opened and the substrate is separated from the dioctadecyldimethylammonium halide solution.

In another preferred embodiment, the method may further comprise the step of, before the barriers are opened, covering the surface of the dioctadecyldimethylammonium halide solution with gauze to remove a film of the dioctadecyldimethylammonium halide formed at the interface between the dioctadecyldimethylammonium halide solution and air.

In another preferred embodiment, the method may further comprise the step of washing the substrate (or the stamp) with water or ethanol and blowing the surface of the substrate (or the stamp) with nitrogen gas, after step f).

In another preferred embodiment, the method of the present invention may further comprise the step of heating the substrate at a temperature of 60-70° C. for 3-10 minutes, after step g).

In still another preferred embodiment, the film of the vanadium pentoxide nanowires bound to the surface of the patterned polymer layer may be transferred to another substrate by micro-contact printing.

According to the present invention, the second object can be accomplished by the provision of a film of vanadium pentoxide nanowires with improved alignment, which is produced by the method.

DETAILED DESCRIPTION OF THE PREFERRED EMBODIMENTS

Figure 1:
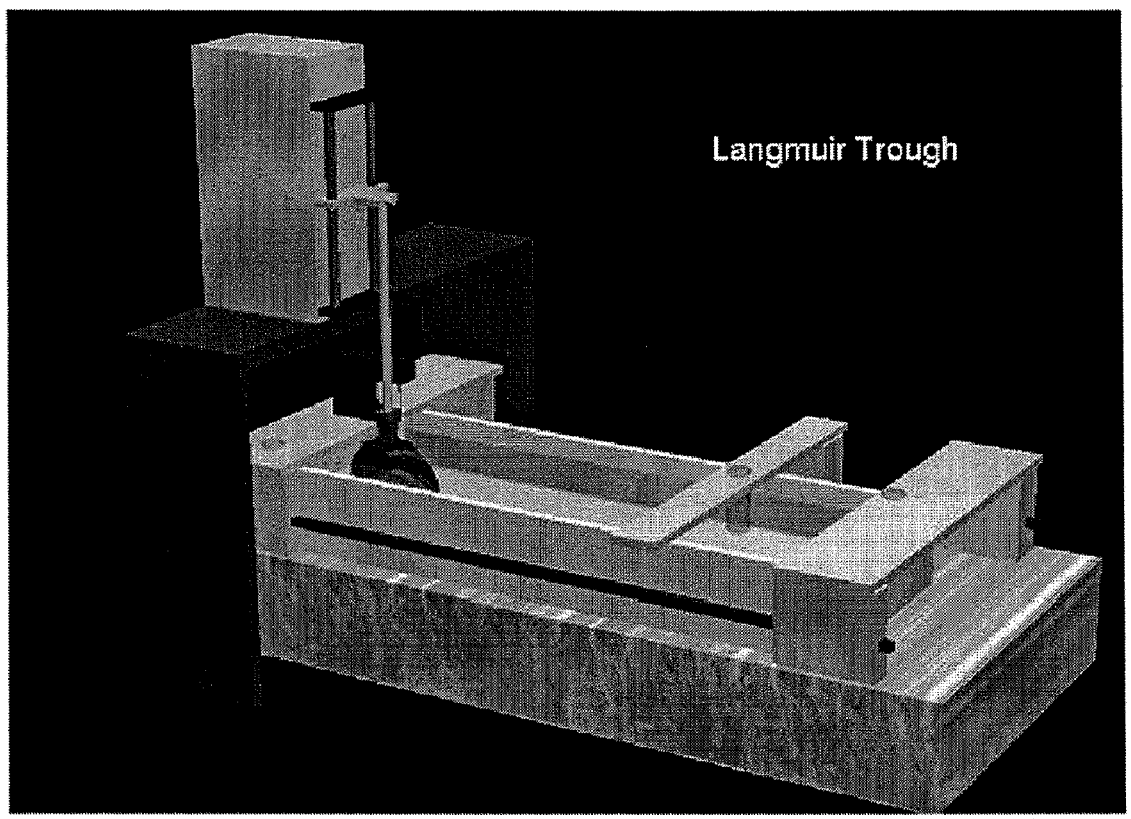
FIG. 1 is a schematic diagram of a conventional Langmuir-Blodgett trough.
Figure 2A:
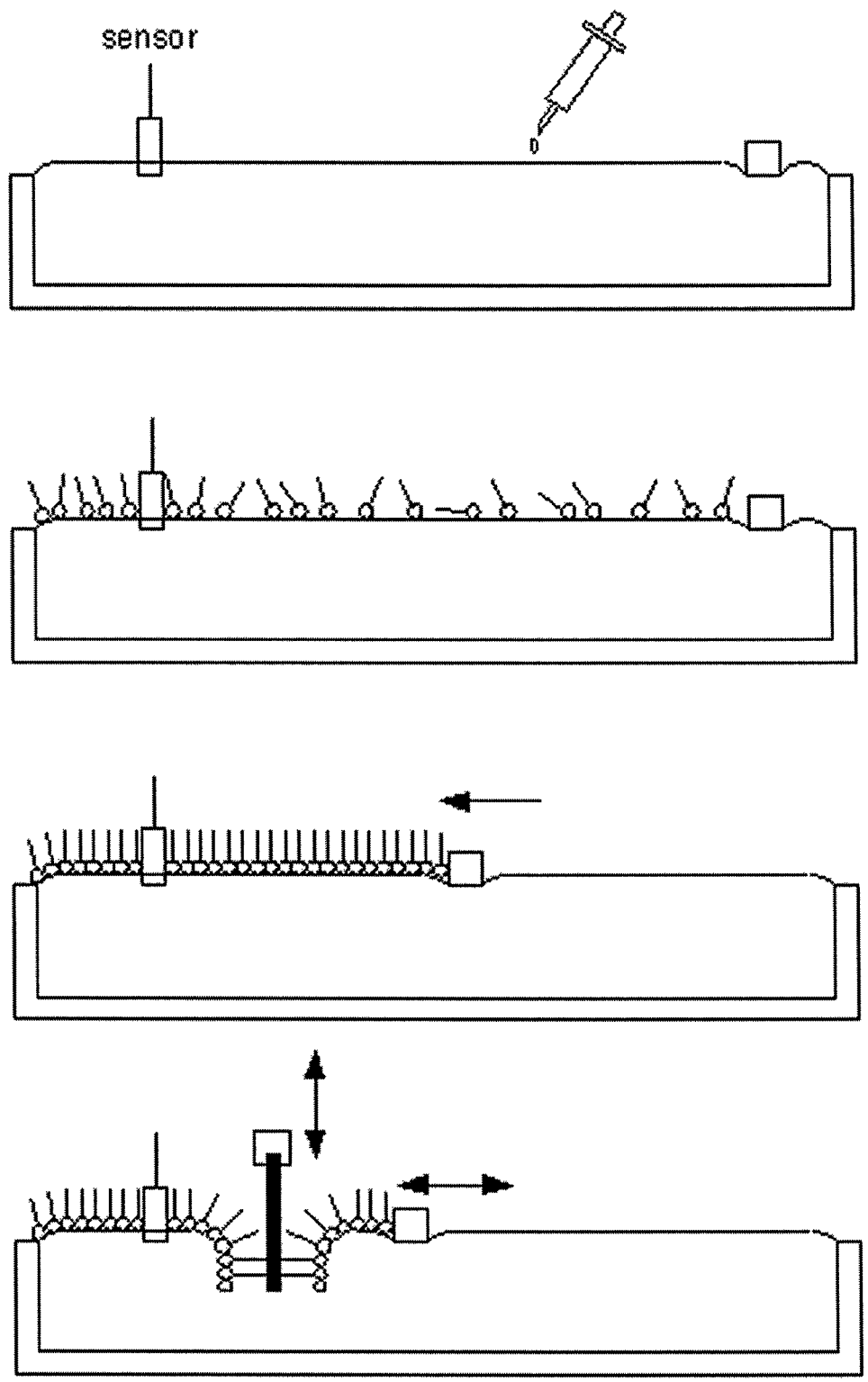
FIGS. 2*a* and 2*b* show schematic diagrams illustrating the processes of conventional Langmuir-Blodgett (LB) and Langmuir-Schaeffer (LS) techniques, respectively.
Figure 2B:
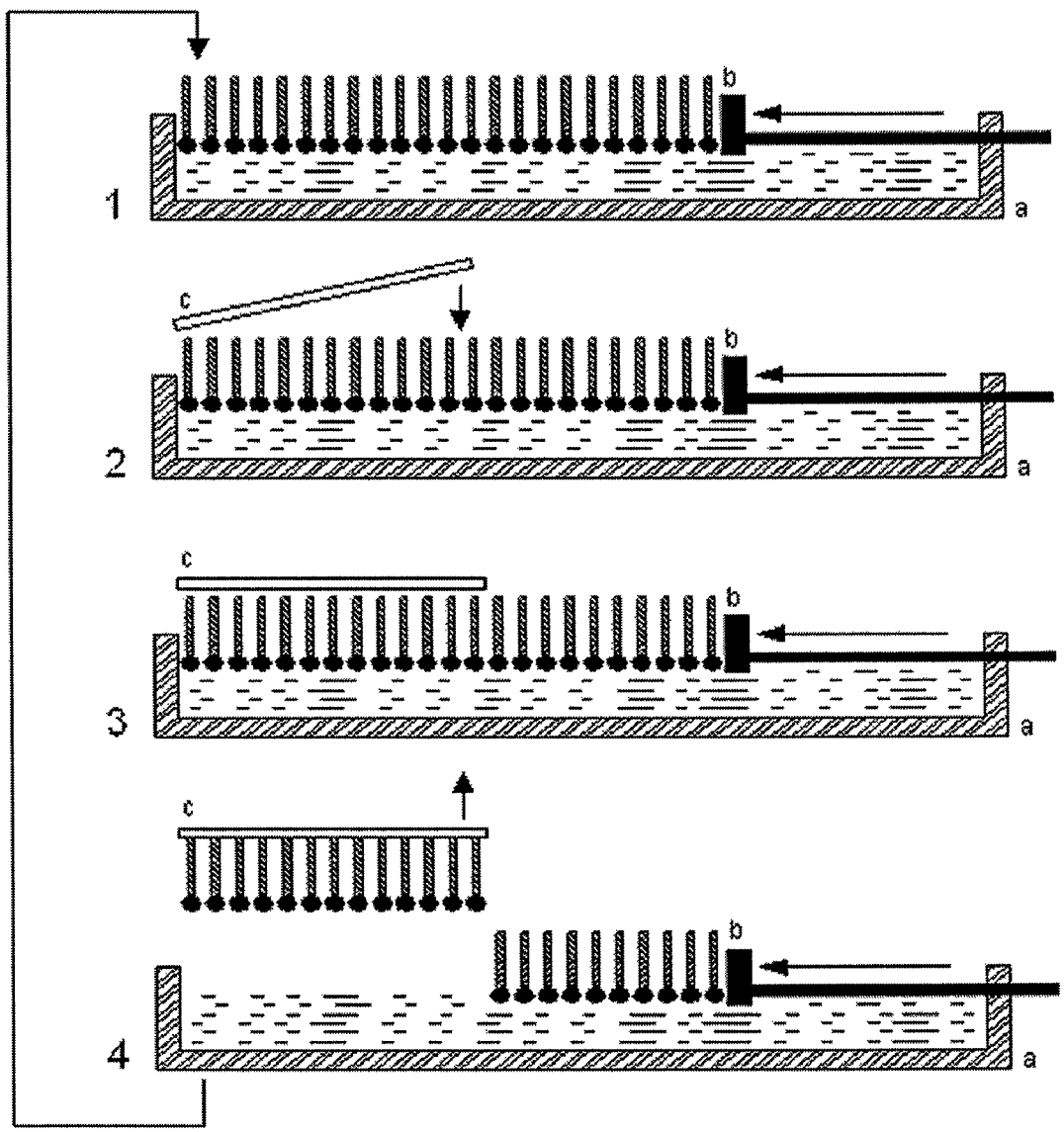

The present invention provides a method for producing a film of vanadium pentoxide nanowires, the method comprising the steps of a) preparing a solution of vanadium pentoxide ($V_2O_5$) nanowires by a sol-gel method; b) diluting the solution of vanadium pentoxide nanowires with water and feeding the dilute aqueous solution into a Langmuir-Blodgett trough; c) adding a dispersant to the dilute aqueous solution of vanadium pentoxide nanowires; d) diluting a solution of a dioctadecyldimethylammonium halide with an organic solvent, applying the dioctadecyldimethylammonium halide solution to the surface of the dilute aqueous solution of vanadium pentoxide nanowires in the Langmuir-Blodgett trough, and allowing the solutions to stand to disperse the dioctadecyldimethylammonium halide solution in the Langmuir-Blodgett trough; e) controlling the surface pressure of the dioctadecyldimethylammonium halide solution using barriers; f) affixing a substrate to a dipping arm of the Langmuir-Blodgett trough and bringing the substrate into contact with the surface of the dioctadecyldimethylammonium halide solution; and g) separating the substrate from the dipping arm.

The sol-gel method for the preparation of a solution of vanadium pentoxide nanowires can be carried out in various ways. For example, ammonium metavanadate, a specified amount of an acidic ion exchange resin and distilled water are simply mixed together to prepare a solution of vanadium pentoxide nanowires.

Next, the vanadium pentoxide sol is diluted with water and fed into a Langmuir-Blodgett trough. At this time, it is preferable to mix 1 ml of the solution of vanadium pentoxide nanowires with 200 to 2,000 ml of the water.

Particularly, after feeding of the vanadium pentoxide sol into the Langmuir-Blodgett trough, a slight amount of a dispersant or a solvent is added to the Langmuir-Blodgett trough to well disperse a dioctadecyldimethylammonium halide solution in the Langmuir-Blodgett trough, so that the alignment of the final vanadium pentoxide nanowire film can be improved. When a solution of a dioctadecyldimethylammonium halide in an organic solvent is added dropwise to the vanadium pentoxide solution in the Langmuir-Blodgett trough in the subsequent step, the dispersant or solvent helps the organic solvent to be well dispersed in the trough. This dispersion makes it possible to produce a uniform dioctadecyldimethylammonium halide/vanadium pentoxide hybrid film via electrostatic interactions between the vanadium pentoxide nanowires and the dioctadecyldimethylammonium halide before adjustment of the surface pressure of the dioctadecyldimethylammonium halide solution by the movement of barriers and to produce a high-quality Langmuir monolayer of the dioctadecyldimethylammonium halide after adjustment of the surface pressure. The film thus produced has greatly improved alignment of the vanadium pentoxide nanowires as compared to films produced without the use of any dispersants.

The dispersant can be selected from the group consisting of ethanol, methanol, acetone, and mixtures thereof. It is preferable to add the dispersant in an amount of 0.06 to 20 parts by volume, based on 100 parts by volume of the dilute aqueous solution of vanadium pentoxide nanowires. When the dispersant is added in an amount of less than 0.06 parts by volume, the dioctadecyldimethylammonium halide solution cannot be effectively dispersed. Meanwhile, when the dispersant, particularly ethanol, is added in an amount exceeding 20 parts by volume, it undesirably dissolves the vanadium pentoxide nanowires in the course of reducing the vanadium pentoxide nanowires while serving to disperse the dioctadecyldimethylammonium halide solution.

Subsequently, the dioctadecyldimethylammonium halide solution is diluted with an organic solvent, and then the dilute solution is applied to the surface of the solution of vanadium pentoxide nanowires in the Langmuir-Blodgett trough.

The dioctadecyldimethylammonium halide (abbreviated as "DODAX") is represented by $[CH_3(CH_2)_{17}]_2N(CH_3)_2^+ X^-$. The dioctadecyldimethylammonium halide is an amphiphilic compound that possesses both hydrophobic and hydrophilic groups in the same molecule. The ionized $DODA^+$ molecules are arrayed such that the hydrophobic alkyl chains direct toward air and the hydrophilic nitrogencontaining moieties direct toward the aqueous solution at the aqueous solution-air interface. Accordingly, the dioctadecyldimethylammonium halide is useful in transferring a film using a Langmuir-Blodgett (LB) trough. Apart form the dioctadecyldimethylammonium halide, any amphiphilic compound may be used in the present invention so long as it is an organic material that has an ammonium cation and is predominantly present in the surface of water.

When the $DODA^+$ molecules are applied to the interface between the aqueous solution of vanadium pentoxide nanowires and air, the negatively charged vanadium pentoxide nanowires present in the aqueous solution are electrostatically bound to the positively charged $DODA^+$ molecules. The binding is highly uniform and dense via electrostatic forces.

Specific examples of suitable dioctadecyldimethylammonium halides for use in the present invention include, but are not limited to, dioctadecyldimethylammonium chloride, dioctadecyldimethylammonium bromide, and dioctadecyldimethylammonium iodide. These dioctadecyldimethylammonium halides have different halogen atoms. The organic solvent used to dilute the dioctadecyldimethylammonium halide is selected from the group consisting of chloroform, chlorobenzene, dichlorobenzene, and mixtures thereof.

The dilute solution of the dioctadecyldimethylammonium halide in the organic solvent preferably has a concentration of 0.05 to 10 mg/ml.

The amount of the dioctadecyldimethylammonium halide applied may cause problems, particularly when it is intended to form a monomolecular layer of the dioctadecyldimethylammonium halide on water. When the dioctadecyldimethylammonium halide is applied in an excessive amount, some of the dioctadecyldimethylammonium halide molecules are dissolved in water to form micelles. The micelles tend to aggregate in the form of composites with $V_2O_5$. Care must be taken when a very small amount of a high-concentration solution of the dioctadecyldimethylammonium halide is applied portionwise using a Hamiltonian syringe.

The use of the Hamiltonian syringe can ensure high-density, uniform application of the dioctadecyldimethylammonium halide solution.

Then, the surface pressure of the dioctadecyldimethylammonium halide solution using barriers mounted on the Langmuir-Blodgett trough is controlled. This step is carried out to uniformly distribute a high-density monolayer of the dioctadecyldimethylammonium halide on the aqueous solution-air interface. It is preferable to adjust the surface pressure to 25 to 40 mN/m.

The density of the vanadium pentoxide nanowires and the thickness of the film are controllable by changing the surface pressure and the frequency of stampings. When it is desired to produce the monolayer to a thickness of 4.5 to 5 nm, it is preferable to adjust the surface pressure to 25 to 40 mN/m. However, taking into consideration the characteristics of a vanadium pentoxide film to be produced and the difference in the amount of the vanadium pentoxide adsorbed during stabilization, the surface pressure range may be varied depending on the purposes and experimental conditions.

After adjustment of the surface pressure, a substrate is affixed to a dipping arm of the Langmuir-Blodgett trough and is brought into contact with the surface of the dioctadecyldimethylammonium halide solution. At this time, the film of the dioctadecyldimethylammonium halide molecules present in the aqueous solution-air interface is transferred to the substrate due to the affinity of the hydrophobic groups of the dioctadecyldimethylammonium halide molecules for the substrate, and as a result, the vanadium pentoxide nanowires electrostatically bound to the dioctadecyldimethylammonium halide are also transferred to the substrate.

The plane of the substrate may be brought into contact with the interface so as to be perpendicular (Langmuir-Blodgett (LB) technique) or parallel (Langmuir-Schaeffer (LS) technique) to each other.

The LB technique is a very useful technique for the formation of a film, irrespective of the surface roughness (or topology) of a substrate because the substrate is dipped while maintaining a desired processing pressure with respect to a film present on water.

The LS technique is similar to the LB technique in that a film present on water can be transferred unchanged to a substrate. However, according to the LS technique, a film cannot be uniformly transferred along a very fine pattern of a substrate having a large surface roughness because the film is simply attached to the substrate. However, since a substrate (or a stamp) can be dipped in a direction parallel to the surface of water, the LS technique is very suitable for the transfer of a pattern.

Figure 6A:
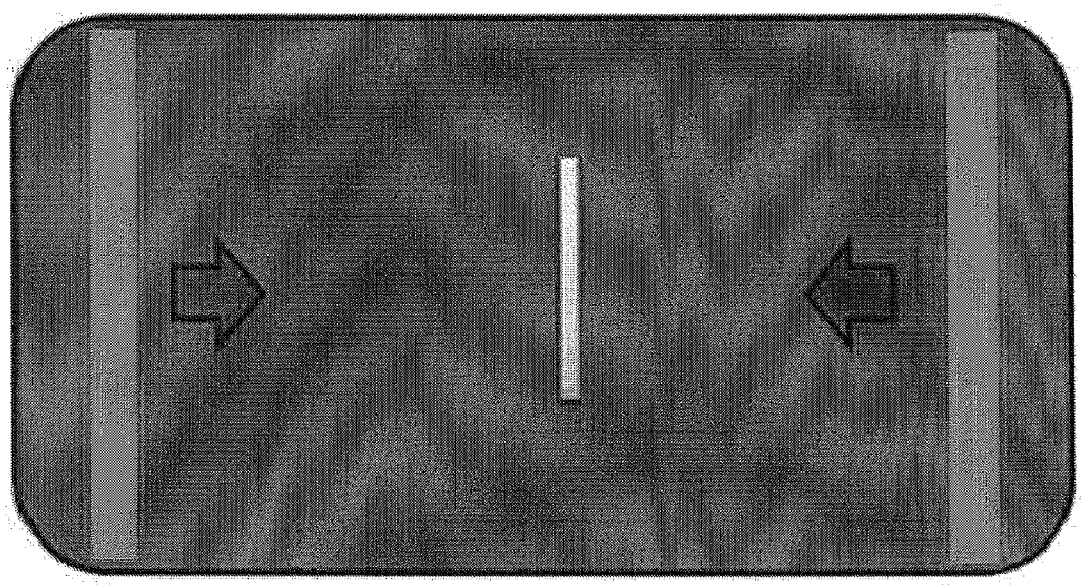
FIGS. 6a and 6b are schematic diagrams of a system used in a method of the present invention, in which barriers are moved in directions perpendicular to the plane of a substrate.
Figure 6B:
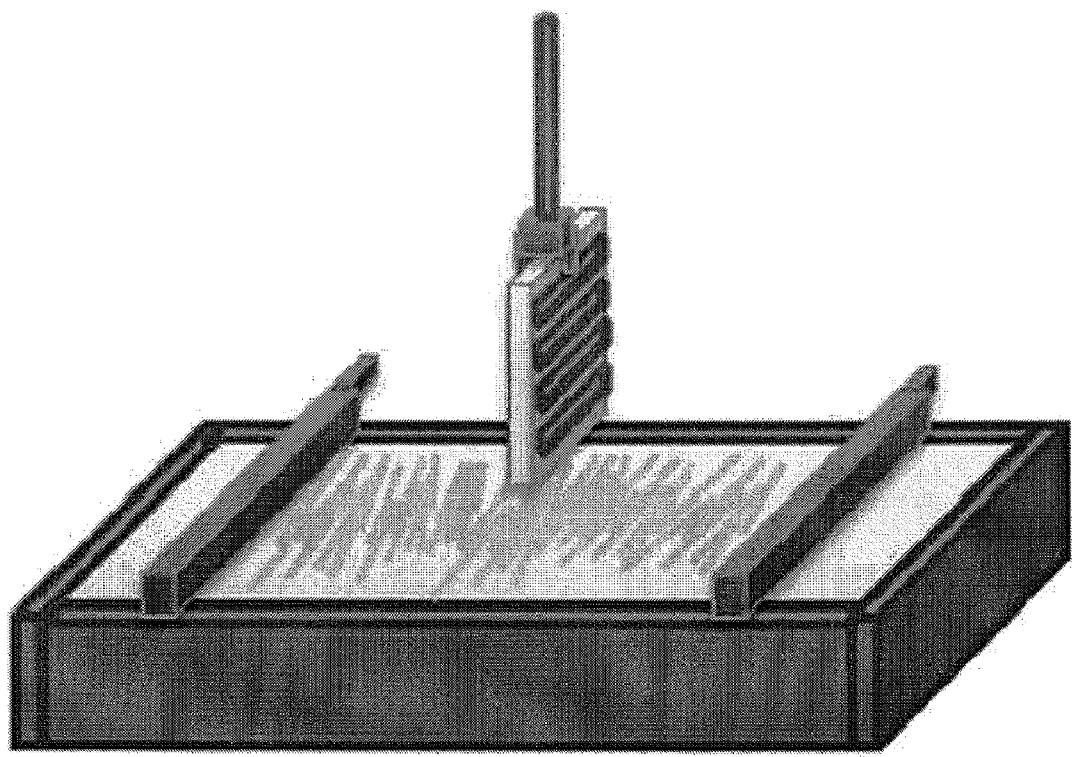
Figure 7A:
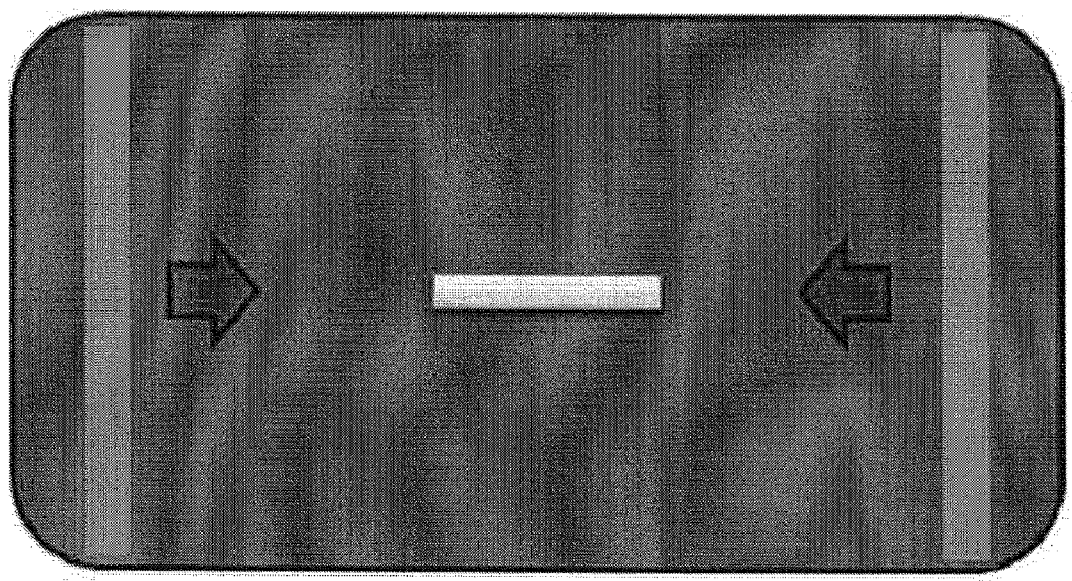
FIGS. 7a and 7b are schematic diagrams of a system used in a method of the present invention, in which barriers are moved in directions parallel to the plane of a substrate.
Figure 7B:
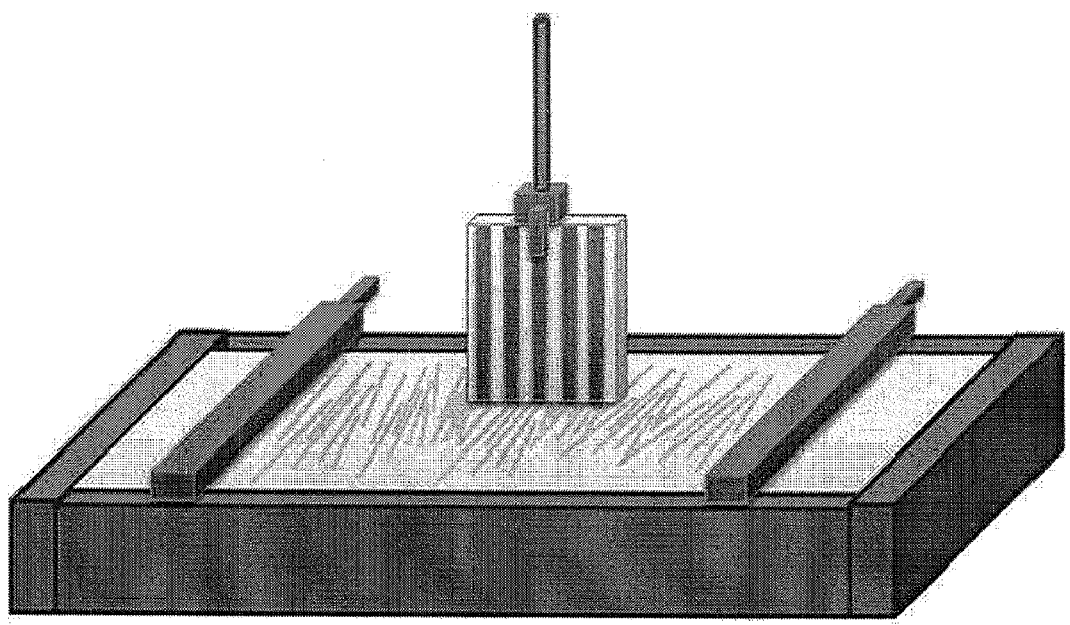

It is common to position the substrate plane in the trough so as to be perpendicular to the moving directions of the barriers for the adjustment of the surface pressure. Alternatively, the substrate plane may be positioned parallel to the moving directions of the barriers. Systems in which the barriers are moved in directions perpendicular to the plane of the substrate are schematically shown in FIGS. 6a and 6b; and systems in which the barriers are moved in directions parallel to the plane of the substrate are schematically shown in FIGS. 7a and 7b. The angles of the moving directions of the barriers with respect to the substrate plane may affect the orientation of the nanowires within a pattern and the density of the nanowires aligned within the substrate. For example, when the substrate is positioned perpendicular to the moving directions of the barriers in the trough, the density of the vanadium pentoxide nanowires can be maintained constant over the entire surface of the substrate through the adjustment of the surface pressure by the movement of the barriers. Meanwhile, when the substrate is positioned parallel to the moving directions of the barriers, the movement of the barriers has little effect on the adjustment of the surface pressure. In the latter case, a portion of the substrate plane, i.e. the lower portion of the substrate, that is in contact with the dioctadecyldimethylammonium halide solution at the initial stage of the dipping of the substrate has a high density of the vanadium pentoxide nanowires and the upper portion of the substrate has a relatively low density of the vanadium pentoxide nanowires, resulting in the production of a vanadium pentoxide nanowire film having a density difference between the upper and lower portions of the substrate.

Figure 10A:
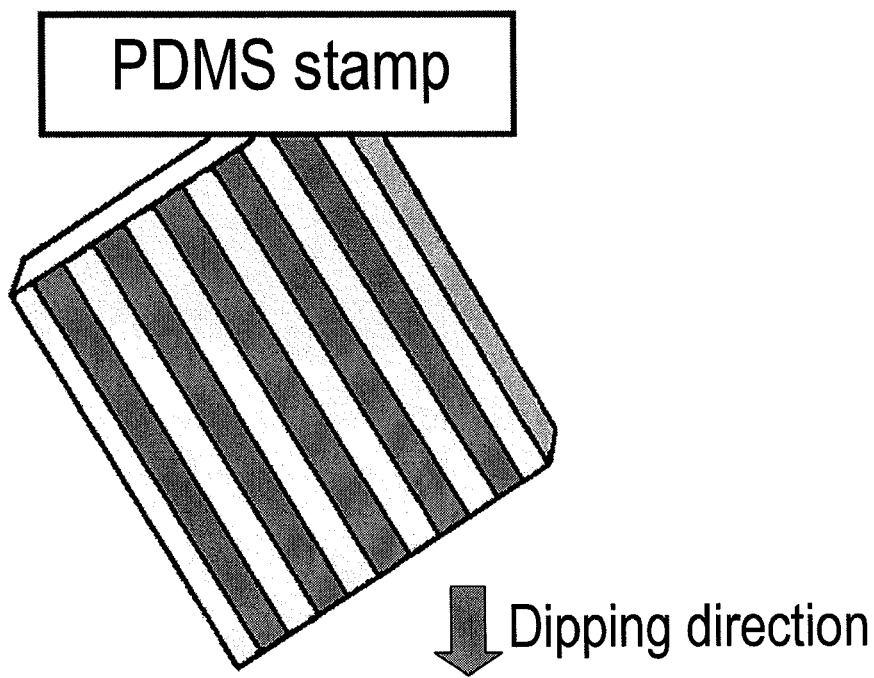
FIGS. 10a and 10c are schematic diagrams illustrating a state in which patterned portions of a substrate is dipped into a dioctadecyldimethylammonium halide solution at an angle ($\theta$) in accordance with a method of the present invention.
Figure 10B:
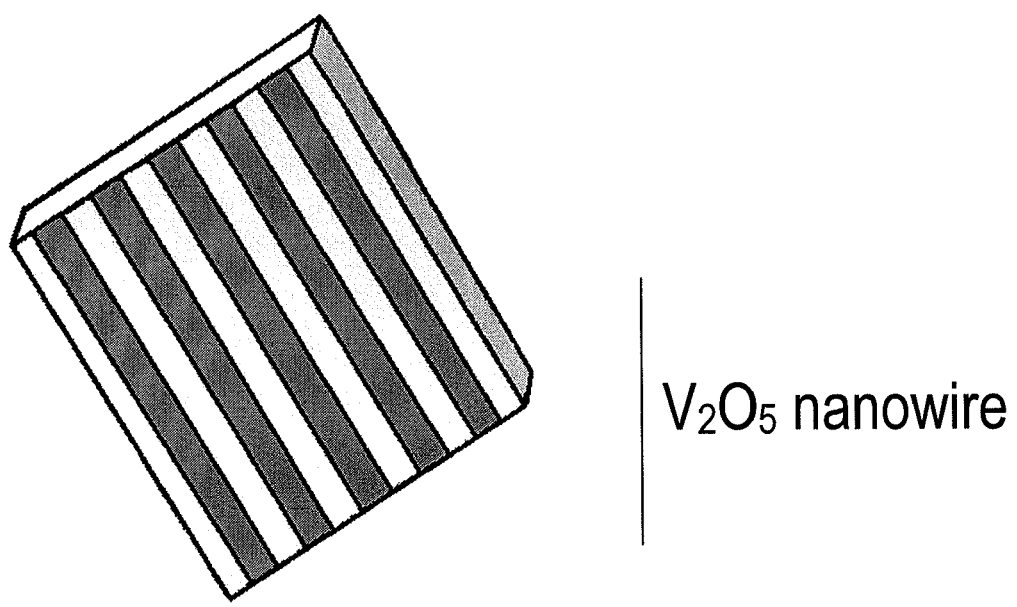
FIGS. 10b and 10d are diagrams illustrating vanadium pentoxide nanowires aligned in the patterned portions and an angle of alignment of the nanowires therein.
Figure 10C:
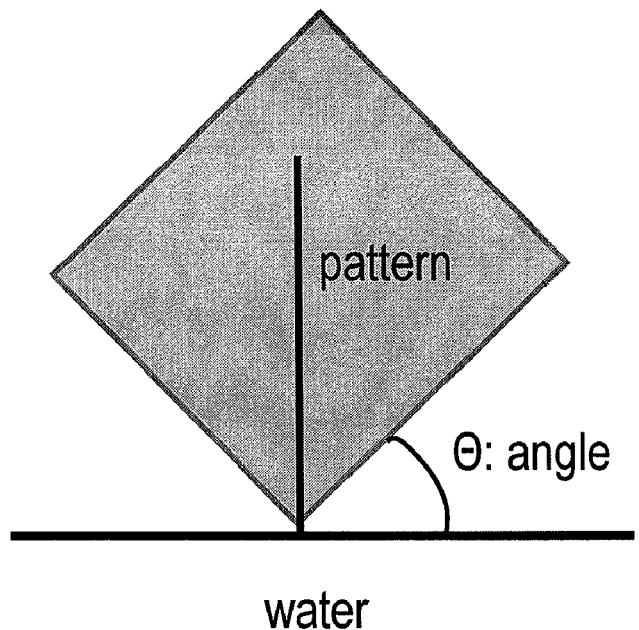
Figure 10D:
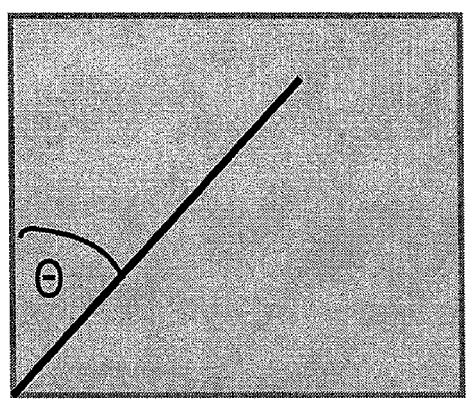
Figure 11:
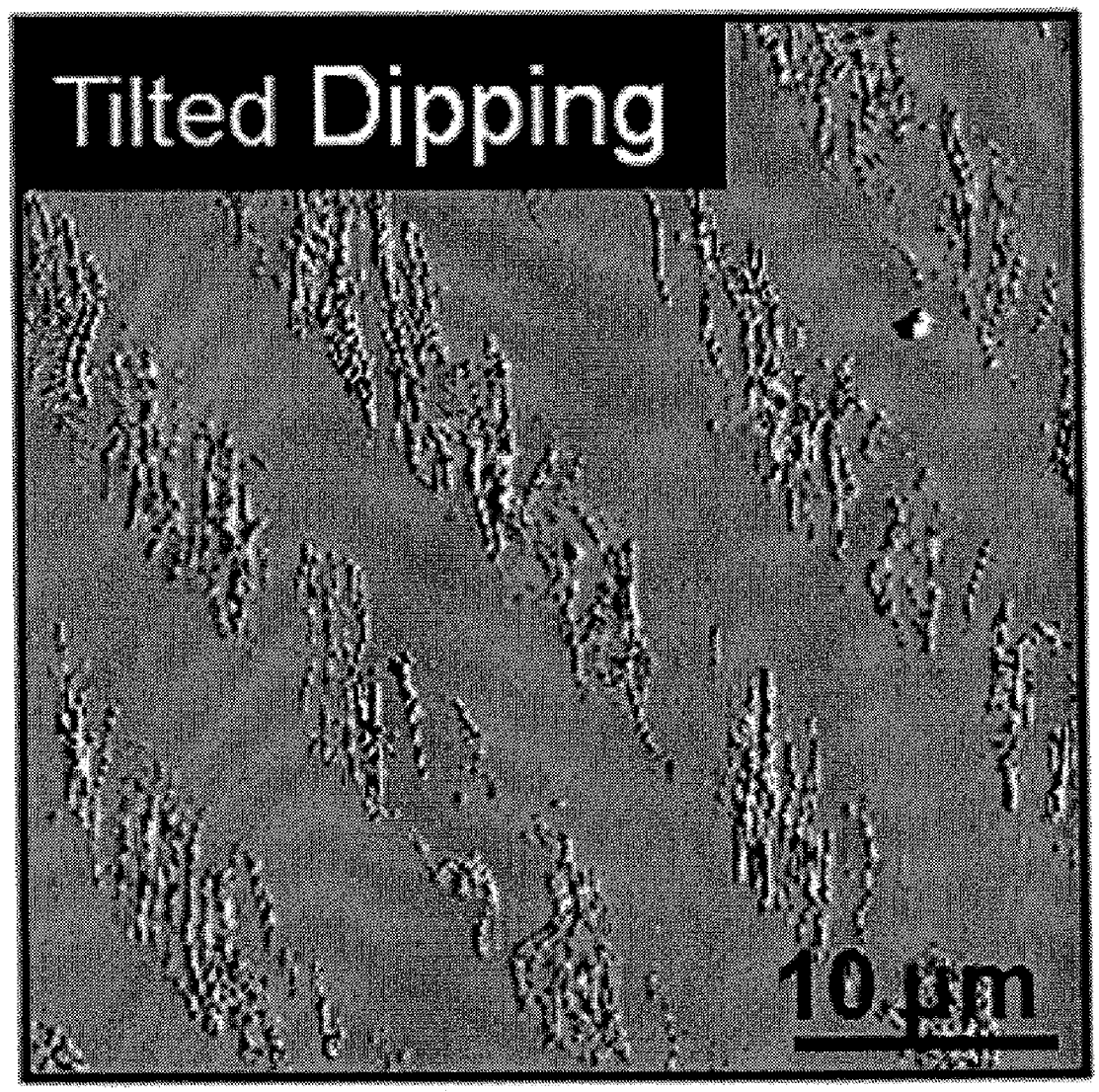
FIG. 11 shows photograph of a pattern of a dioctadecyldimethylammonium halide/vanadium pentoxide nanowire hybrid film produced using the system of FIGS. 10a, 10b, 10c and 10d.

In the meanwhile, the angle between patterned portions of the substrate and the surface of the dioctadecyldimethylammonium halide solution, that is, the dipping angle of the substrate with respect to the surface of the solution, may be varied so that the vanadium pentoxide nanowires formed in the patterned portions can be aligned to have a predetermined angle (FIGS. 10a and 10c). FIGS. 10b and 10d show the vanadium pentoxide nanowires aligned in the patterned portions and the angle of alignment of the nanowires therein. For example, FIG. 11 shows photograph of a pattern of a dioctadecyldimethylammonium halide/vanadium pentoxide nanowire hybrid film produced using the system of FIGS. 10a, 10b, 10c and 10d.

The film can be transferred to the substrate by the LB or LS technique, as mentioned earlier. When the substrate is a surface-patterned polymer stamp, a particular pattern can also be transferred thereto. The polymer may be polydimethylsiloxane (PDMS), but is not limited thereto.

Figure 3:
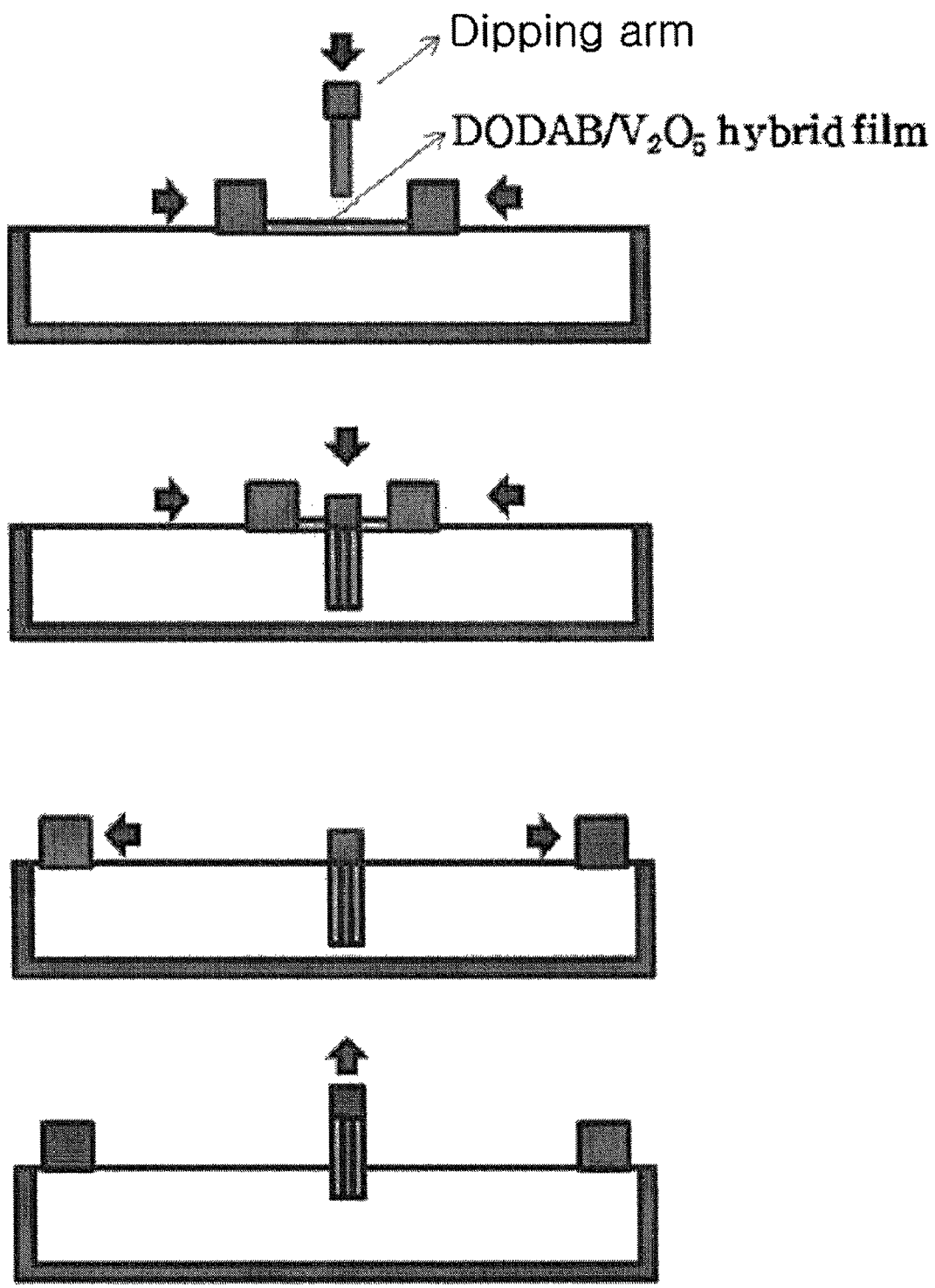
FIG. 3 shows schematic diagrams illustrating a method for producing a film of vanadium pentoxide nanowires according to one embodiment of the present invention.

After the substrate plane is dipped in a direction perpendicular to the surface of the dioctadecyldimethylammonium halide solution, the barriers are maximally opened and the substrate is separated from the dioctadecyldimethylammonium halide solution. The method of the present invention is schematically illustrated in FIG. 3. A portion of the dioctadecyldimethylammonium halide not ionically crosslinked with the vanadium pentoxide nanowires remains separated on the water surface. As a result, the substrate can be effectively washed, thus eliminating the need for subsequent washing.

An additional washing effect can be attained by covering the surface of the dioctadecyldimethylammonium halide solution with gauze to remove a film of the dioctadecyldimethylammonium halide formed at the interface between the dioctadecyldimethylammonium halide solution and air, before the barriers are opened.

As described above, when a patterned stamp is used as the substrate, the stamp is washed with water or ethanol and blown with nitrogen gas to remove the molecular layer of the dioctadecyldimethylammonium halide and the vanadium pentoxide nanowires formed other than the patterned portions of the substrate. Subsequently, the pattern of the substrate may be transferred to another substrate by micro-contact printing.

After the transfer of the film or pattern, it is essential to separate the substrate (or the stamp) from the dipping arm and heat the substrate. The reason for heating is to develop the pattern. The pattern development by heating is essential, particularly when the size of the pattern is very small. The heating can reduce the time required to dry the film on the substrate and affects the size and shape of the pattern.

Specifically, the substrate is heated at a temperature of 60 to 70° C. for 3 to 10 minutes. The film may be thermally damaged at a temperature higher than 70° C. When the heating time is shorter than 3 minutes, the pattern may be distorted upon being transferred. This distortion of the pattern is caused by the adherence of the hybrid film along the topology of the stamp, which is directly transferred to the substrate. Meanwhile, when the heating time is greater than 10 minutes, the substrate (or the polymer stamp) for the transfer of the pattern to another substrate may be undesirably deformed or lose its elasticity, resulting in poor wetting between the substrates.

The present invention also provides a film of vanadium pentoxide nanowires with improved alignment, which is produced by the method.

The alignment of vanadium pentoxide nanowires in the film of the present invention is markedly improved. Therefore, the present invention provides a basic patterning technique for the formation of circuits by patterning nanowires as one-dimensional nanostructures in a dispersion state at desired locations of a substrate where a device is to be fabricated.

This alignment improvement ensures the improved reproducibility and stability of a device using the nanowire film and achieves improved characteristics of the device. Also, the length of the nanowires can be controlled to a desired level by varying the size of a pattern of the stamp. Therefore, the vanadium pentoxide nanowire film of the present invention can be widely utilized in the fabrication of a variety of devices, including field effect transistors and sensors.

Hereinafter, the present invention will be explained in more detail with reference to the following examples. However, these examples serve to provide further appreciation of the invention but are not meant in any way to restrict the scope of the invention.

EXAMPLES

Example 1

An LB trough (KSV2000, KSV, Finland) fitted with a dipping arm and a paper substrate (perimeter: 20.0 mm) for pressure measurement was used. 0.4 g of ammonium metavanadate (99%, Aldrich), 1 g of an acidic ion exchange resin (DOWEX50WX8-100, Sigma-Aldrich) and 100 ml of distilled water (Millipore) were mixed together to prepare a solution of vanadium pentoxide nanowires (sol-gel method). The vanadium pentoxide nanowires were grown at room temperature for more than six months. The solution of vanadium pentoxide nanowires was 2.000-fold diluted with water and filled in an LB trough. Next, 10 ml of ethanol as a dispersant was added to the solution of vanadium pentoxide nanowires to disperse the dioctadecyldimethylammonium halide solution. Dioctadecyldimethylammonium bromide (DODAB, ≧98%, TCI) was dissolved in chloroform (≧99.8% (GC), stabilized with ~1% ethanol, Fluka) to prepare a solution having a concentration of 0.1 ml/ml. The DODAB solution was ultrasonicated and applied to the surface of the dilute solution of vanadium pentoxide nanowires using a Hamiltonian syringe in the LB trough.

After barriers were closed until the processing pressure reached a desired level (for example, 25 mN/m as for a monomolecular layer), the film was stabilized for about 48 hours. A substrate (or a PDMS stamp) was clamped with the dipping arm and then the film was transferred thereto while maintaining the surface pressure at the processing pressure. The stamp was manufactured by mixing DC 184-A and DC 184-B, both of which were commercially available from DOW Corning, in a weight ratio of 10:1, pouring into a silicon master, allowing to stand in air until air bubbles disappeared, and calcining in an oven for 2 hours or more. Thereafter, the substrate (or the stamp) was blown. If needed, the substrate (or the stamp) was washed and rinsed with distilled water and blown with nitrogen gas. As a result of the blowing, a portion of the DODAB not electrostatically bound to the $V_2O_5$ was selectively removed and a portion of the DODAB electrostatically bound to the $V_2O_5$ participated in the formation of a $DODA^+/V_2O_5$ hybrid film via ion exchange.

FIGS. 13a to 13f are atomic force microscope images of the films produced after the substrate (or the stamp) was washed and rinsed with distilled water and blown with nitrogen gas. As is apparent from FIGS. 13a to 13f, the more times the substrate (or the stamp) is washed and blown, the more the portion of the DODAB not electrostatically bound to the $V_2O_5$ was selectively removed.

The substrate (or the PDMS stamp) was brought into contact with another substrate for a sufficient time and separated to transfer the pattern thereto. The contact time varied depending on the surface roughness of a substrate to which the pattern was to be transferred. For example, about 5 seconds were required to transfer the pattern to a planar substrate. As the surface roughness increased, the contact time was lengthened.

Example 2

A pattern was transferred in the same manner as in Example 1 except that after the substrate (or the PDMS stamp) was brought into contact with the surface of the dioctadecyldimethylammonium halide solution, the barriers were maximally opened and the dipping arm was taken out of the dioctadecyldimethylammonium halide solution. At this time, the substrate was positioned perpendicular to the moving directions of the barriers.

Example 3

A pattern was transferred in the same manner as in Example 2 except that the substrate was positioned parallel to the moving directions of the barriers.

Comparative Example 1

A pattern was transferred in the same manner as in Example 1 except that the dispersant was not added.

Comparative Example 2

A pattern was transferred in the same manner as in Example 2 except that the dispersant was not added. That is, after the substrate (or the PDMS stamp) was brought into contact with the surface of the dioctadecyldimethylammonium halide solution, the barriers were maximally opened (gluing LB technique).

Evaluations

Figure 4:
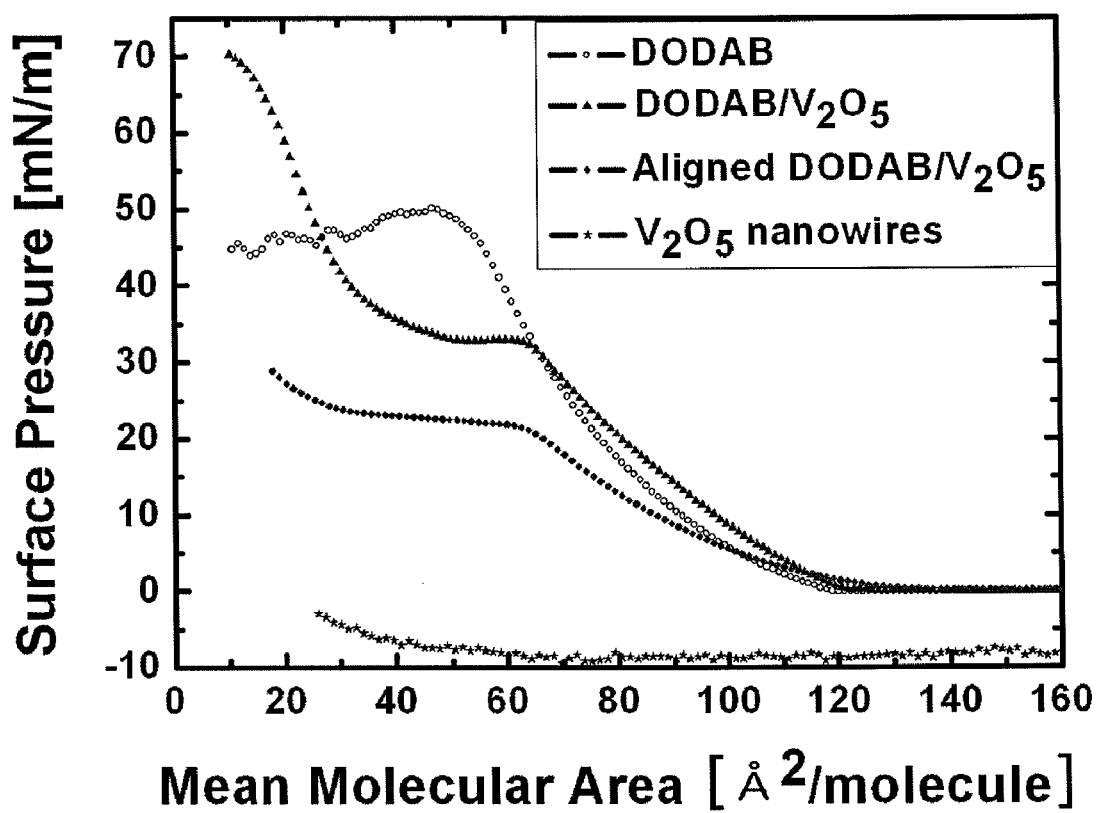
FIG. 4 is a graph showing the variations in the surface pressure of dioctadecyldimethylammonium halide/vanadium pentoxide nanowire films produced in Example 1 and Comparative Example 1, the dioctadecyldimethylammonium halide and the vanadium pentoxide nanowires as a function of mean molecular area.

FIG. 4 shows the variations in the surface pressure of the dioctadecyldimethylammonium halide/vanadium pentoxide nanowire films produced in Example 1 and Comparative Example 1, the dioctadecyldimethylammonium halide and the vanadium pentoxide nanowires as a function of mean molecular area.

Comparing the data of the films produced in Example 1 and Comparative Example 1, the surface pressure values of the film produced in Example 1 were higher with lower slopes at larger mean molecular areas than those of the film produced in Comparative Example 1. In addition, the surface pressure plateau of the film produced in Example 1 was longer than that of the film produced in Comparative Example 1.

Particularly, from the data regarding the points at which the surface pressure began to increase, it is evident that when the chloroform solution of the dioctadecyldimethylammonium halide was added dropwise using the Hamiltonian syringe, the dioctadecyldimethylammonium halide was well dispersed by the dispersant present in a slight amount in the trough. This dispersion enhances the intermolecular interactions of the dioctadecyldimethylammonium halide in a broader area of the trough. This fact is supported by the lower slopes of the surface pressure. It can be estimated from the longer plateau that the vanadium pentoxide nanowires had a strong tendency to be aligned. This tendency could be identified by atomic force microscopy, which will be described below.

Further, the film produced in Comparative Example 1 collapsed at a plateau of about 45 $Å^2$/molecule, whereas the film produced in Example 1 collapsed at a plateau of about 40 $Å^2$/molecule. These results demonstrate that the dispersant assisted in dispersing the dioctadecyldimethylammonium halide solution at the air/water interface and the alignment of the vanadium pentoxide nanowires after the adjustment of the surface pressure was improved through the binding between the well-dispersed the dioctadecyldimethylammonium halide solution and the vanadium pentoxide nanowires.

Figure 5A:
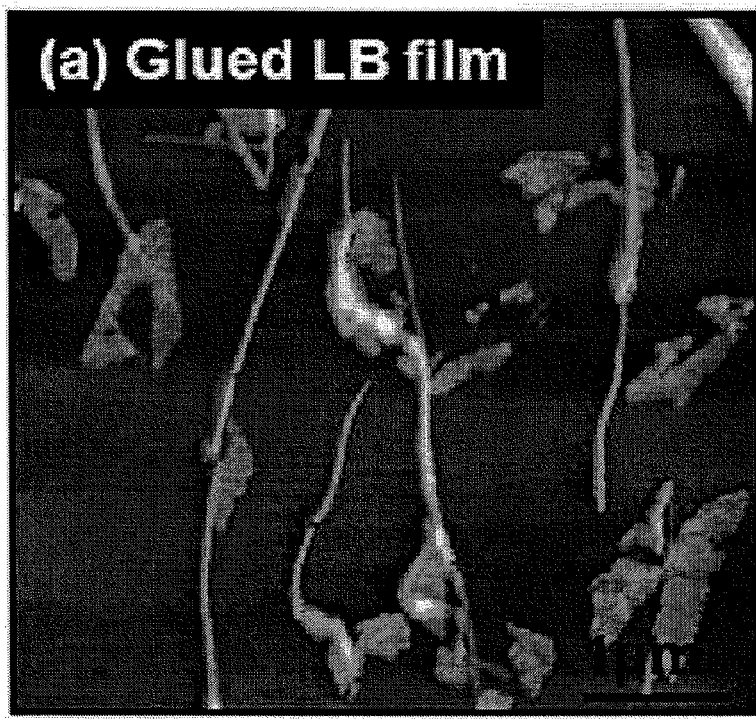
FIGS. 5a and 5b are atomic force microscope images of films produced using a gluing LB technique and a common LS technique, respectively.
Figure 5B:
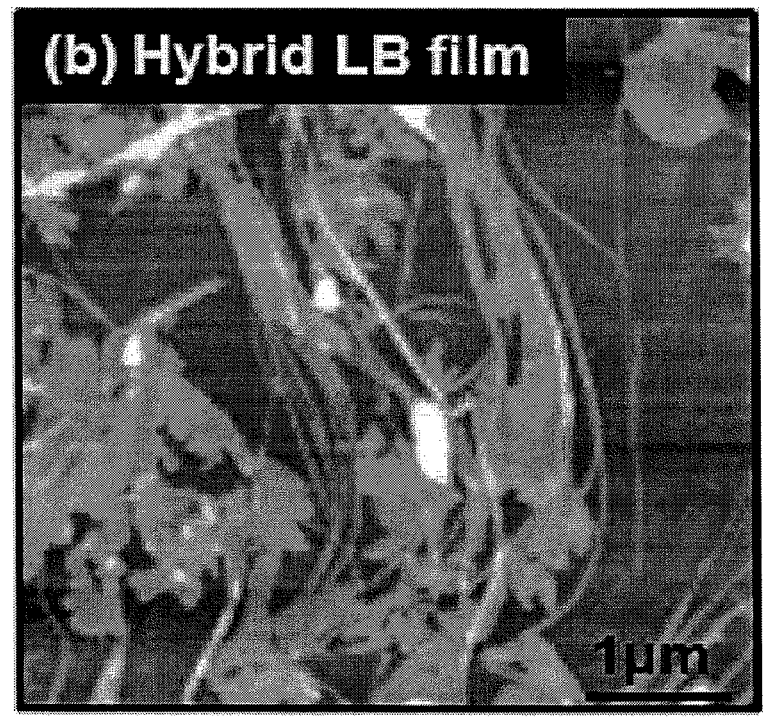

FIGS. 5a and 5b are atomic force microscope images of the films produced in Comparative Examples 1 (5b) and 2 (5a). The images of FIGS. 5a and 5b show that the amount of the dioctadecyldimethylammonium halide remaining in the film produced by a gluing LB technique (Comparative Example 2) was smaller than that of the dioctadecyldimethylammonium halide remaining in the film produced by a common LS technique (Comparative Example 1), indicating the washing effect of the gluing LB technique.

Figure 8:
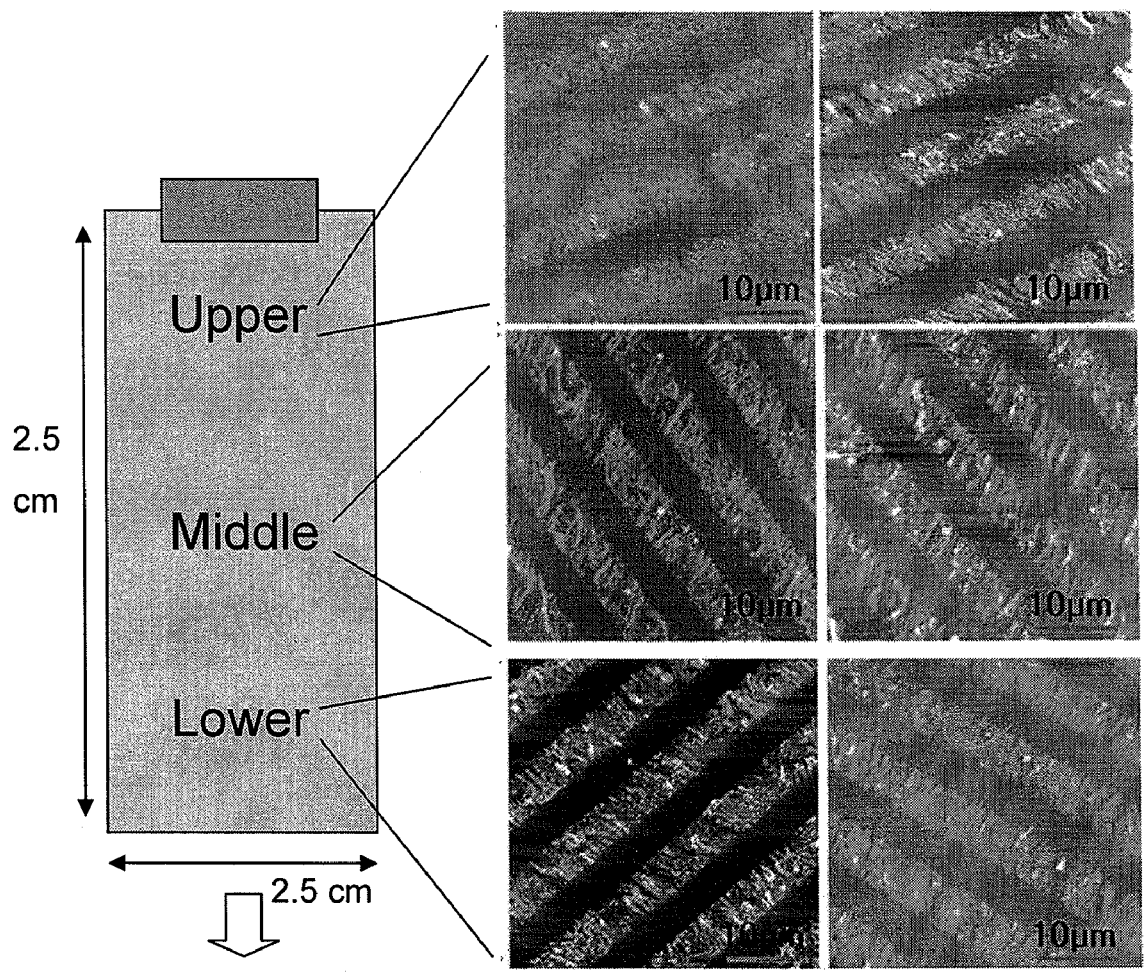
FIG. 8 shows photographs of upper, middle and lower portions of a pattern of a dioctadecyldimethylammonium halide/vanadium pentoxide nanowire hybrid film produced using the system of FIGS. 6a and 6b.
Figure 9:
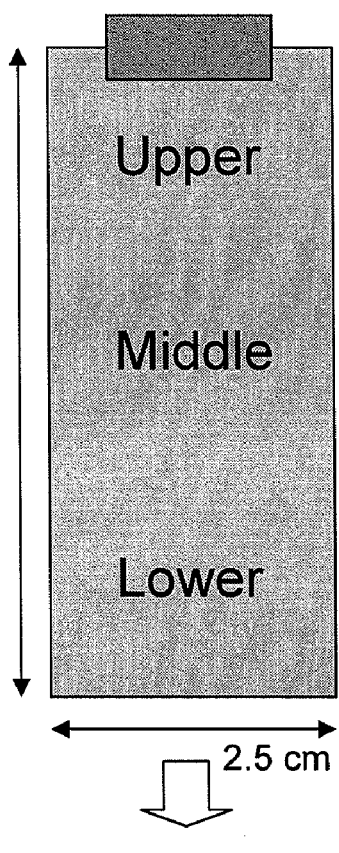
FIG. 9 shows photographs of upper, middle and lower portions of a pattern of a dioctadecyldimethylammonium halide/vanadium pentoxide nanowire hybrid film produced using the system of FIGS. 7a and 7b.
Figure 9:
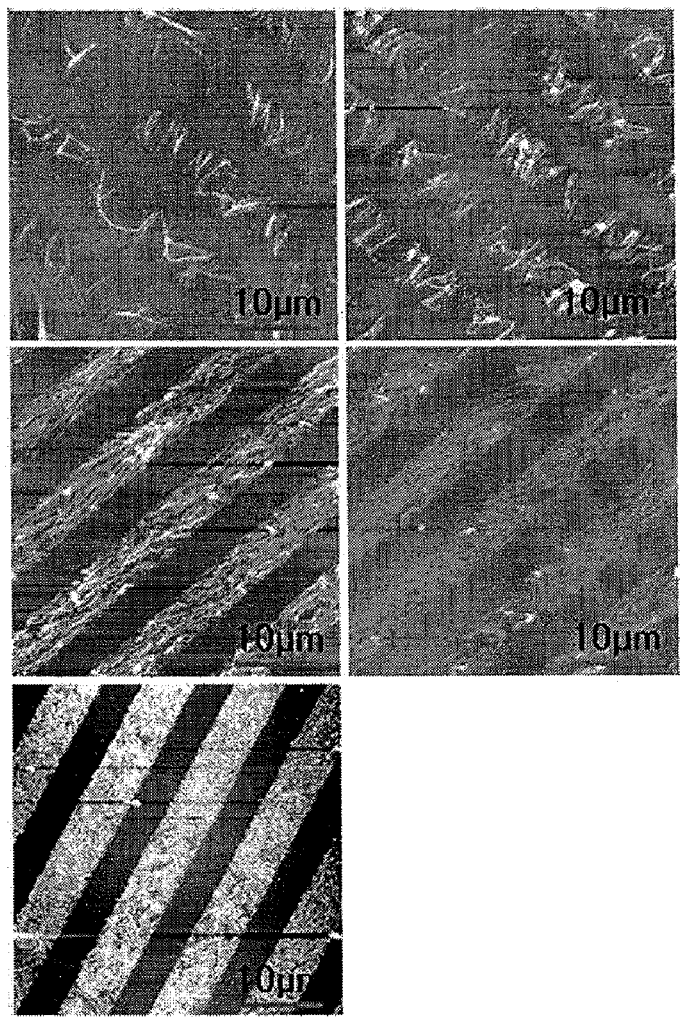

To evaluate the influence of the angle between the position of the substrate and the moving directions of the barriers on the alignment of the transferred pattern, photographs of upper, middle and lower portions of the pattern of the dioctadecyldimethylammonium halide/vanadium pentoxide nanowire hybrid film produced in Examples 2 and 3 were taken and are shown in FIGS. 8 and 9, respectively. The photographs of FIG. 8 reveal that when the substrate was positioned perpendicular to the moving directions of the barriers in the trough (Example 2), the density of the vanadium pentoxide nanowires was maintained constant over the entire surface of the substrate through the adjustment of the surface pressure by the movement of the barriers, resulting in the uniform transfer of the pattern over the entire surface of the substrate. Meanwhile, the photographs of FIG. 9 reveal that when the substrate was positioned parallel to the moving directions of the barriers (Example 3), the movement of the barriers had little effect on the adjustment of the surface pressure. In this case, a portion of the substrate plane, i.e. the lower portion of the substrate, that was in contact with the dioctadecyldimethylammonium halide solution at the initial stage of the dipping of the substrate had a high density of the vanadium pentoxide nanowires and the upper portion of the substrate had a relatively low density of the vanadium pentoxide nanowires, resulting in the production of a vanadium pentoxide nanowire film having a density difference between the upper and lower portions of the substrate. In other words, the pattern alignment was dependent on the dipping direction of the substrate at the initial stage of the dipping, but it was predominantly dependent on the meniscus of the water on the substrate at the end of the dipping.

Figure 12:
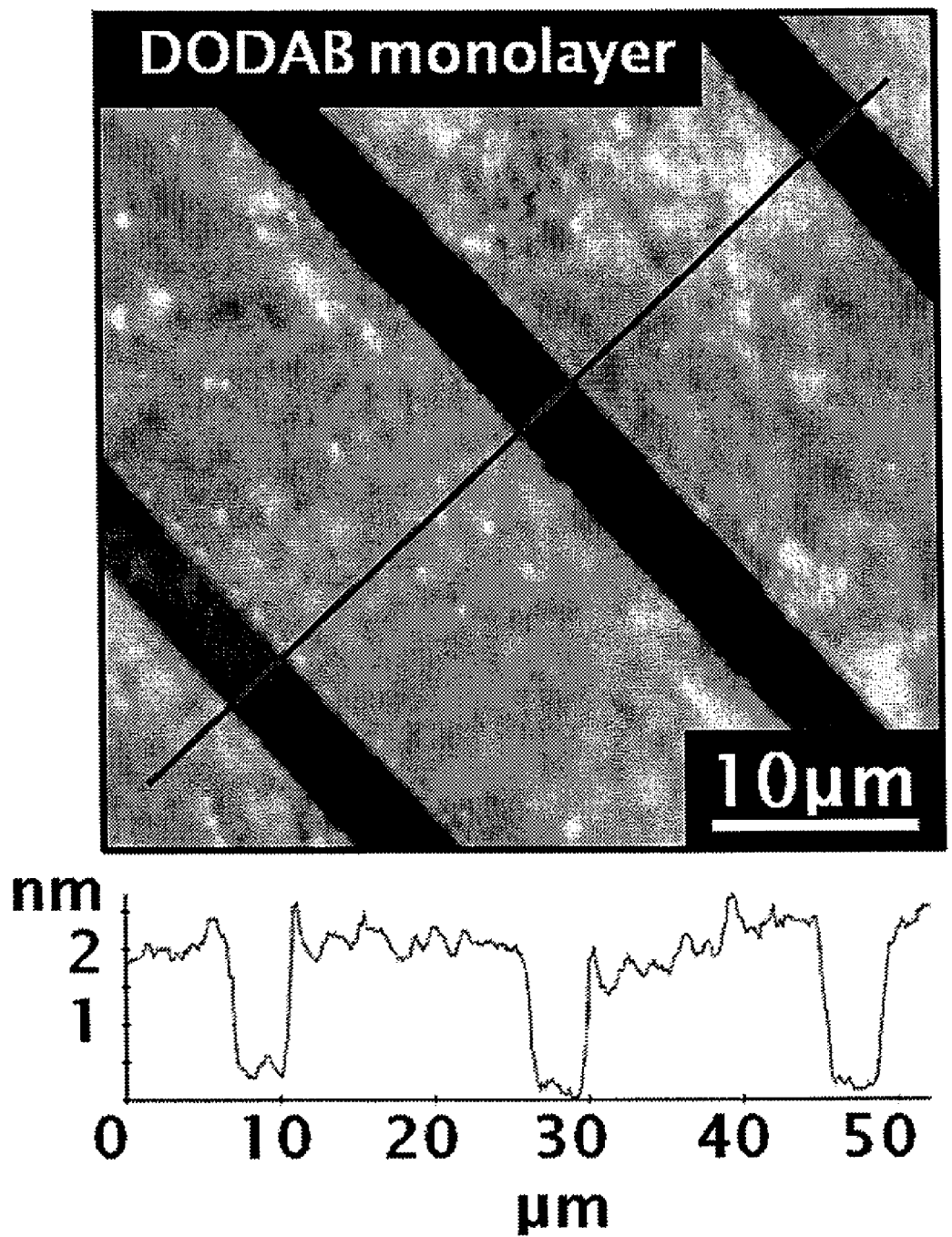
FIG. 12 shows the atomic force microscope image of the bare $SiO_2$ surface after the LS transfer of pure DODAB monolayer.
Figure 13A:
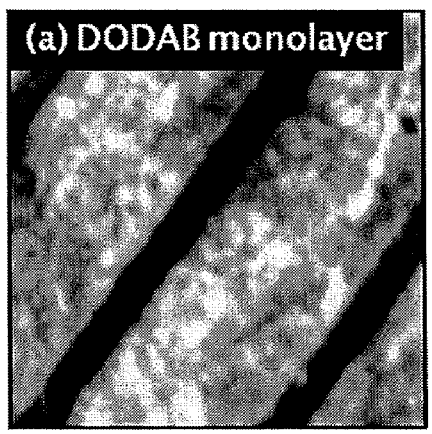
FIGS. 13a to 13f are atomic force microscope images of the films produced in Example 1 after the substrate (or the stamp) was washed and rinsed with distilled water and blown with nitrogen gas (FIG. 13a taken after one cycle of washing and blowing, FIG. 13b—taken after two cycles, FIG. 13c—taken after three cycles, FIG. 13d—taken after four cycles, FIG. 13e—taken after five cycles, FIG. 13f—taken after six cycles)
Figure 13B:
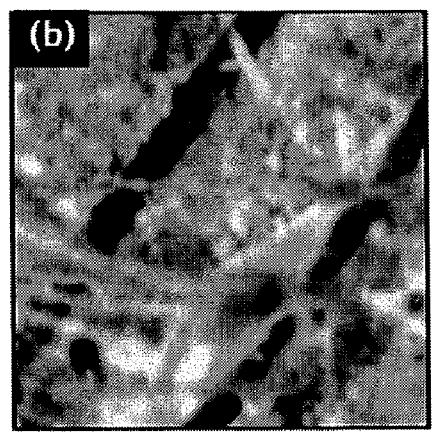
Figure 13C:
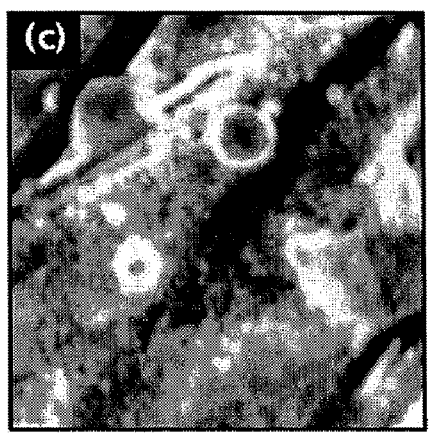
Figure 13D:
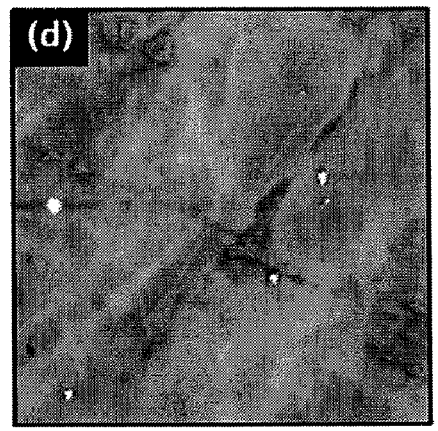
Figure 13E:
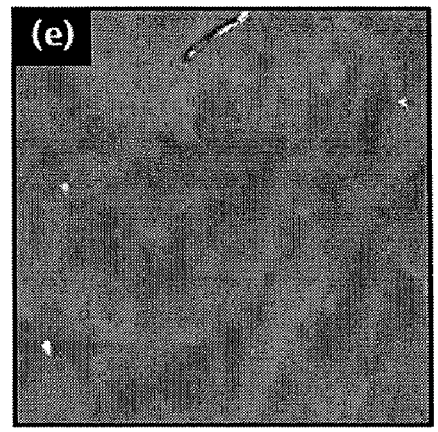
Figure 13F:
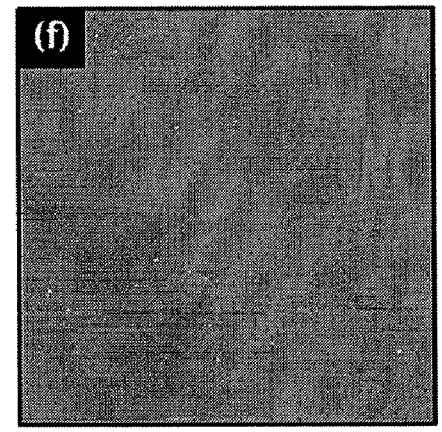

Meanwhile, FIG. 12 shows the atomic force microscope image of the bare $SiO_2$ surface after the LS transfer of pure DODAB monolayer.

Figure 14:
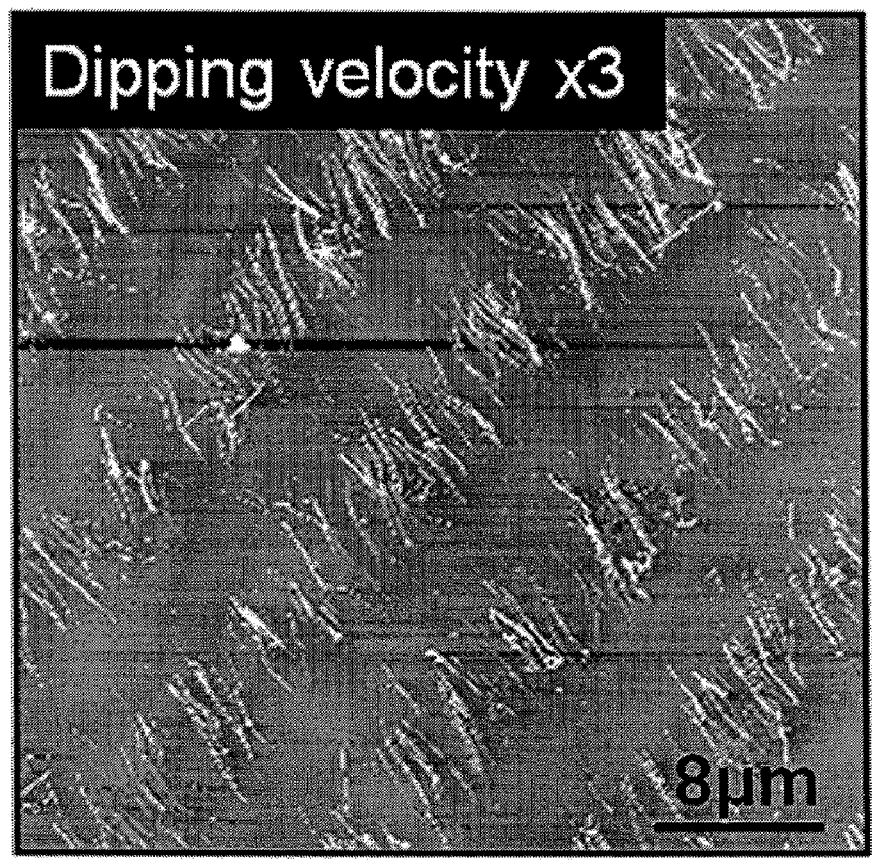
FIG. 14 is the atomic force microscope image showing the effect of the dipping velocity on the alignment of the pattern.

The patterning of the vanadium pentoxide nanowires can also be affected by the dipping velocity. For example, as the dipping velocity is increased by three times of the Example 1, the alignment of the pattern was also improved as shown by the atomic force microscope image of FIG. 14.

Figure 15:
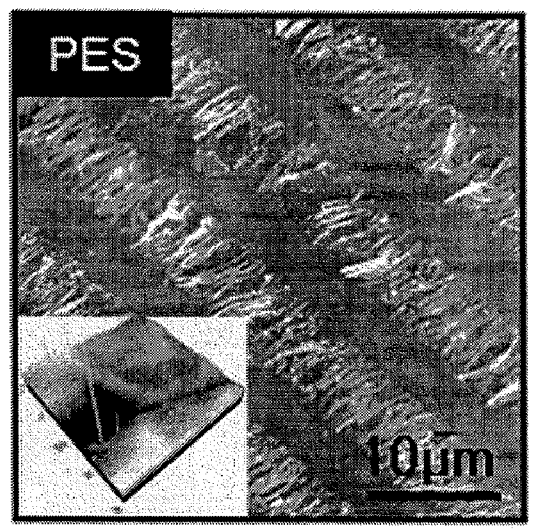
FIG. 15 is the atomic force microscope image of the vanadium pentoxide nanowire pattern on the poly(ether sulfone) substrate (Inset FIG shows the bare poly(ether sulfone) substrate).

Also, the present invention can be applied to the substrate other than $SiO_2$. For example, the vanadium pentoxide nanowire pattern can be prepared on the poly(ether sulfone) substrate as shown by the atomic force microscope image of FIG. 15 (Inset FIG shows the bare poly(ether sulfone) substrate).

As apparent from the foregoing, the present invention provides a method for the production of a film of vanadium pentoxide nanowires using sol-gel synthesis. According to the method of the present invention, the alignment of the nanowires can be markedly improved, the need for subsequent washing can be eliminated, which contributes to the simplification of the production process, and the nanowires can be cut to desired lengths in a simple manner. Therefore, the reproducibility of a device using the nanowire film is ensured and improvement in the characteristics of the device can be achieved.

The present invention also provides a nanowire device comprising a film produced by the method. The nanowire device can find application in various fields, including field effect transistors and a variety of sensors, due to its excellent characteristics and reproducibility. In addition, an electroplating technique can be applied to the patterning of metal interconnects, such as copper (Cu) and cobalt (Co) interconnects, using the nanowires as templates.

That which is claimed:

1. A method for producing a film of vanadium pentoxide nanowires with improved alignment, the method comprising the steps of
    a) preparing a solution of vanadium pentoxide ($V_2O_5$) nanowires by a sol-gel method,
    b) diluting the solution of vanadium pentoxide nanowires with water and feeding the dilute aqueous solution into a Langmuir-Blodgett trough,
    c) adding a dispersant to the dilute aqueous solution of vanadium pentoxide nanowires,
    d) diluting a solution of a dioctadecyldimethylammonium halide with an organic solvent, applying the dioctadecyldimethylammonium halide solution to the surface of the dilute aqueous solution of vanadium pentoxide nanowires in the Langmuir-Blodgett trough, and allowing the solutions to stand to disperse the dioctadecyldimethylammonium halide solution in the Langmuir-Blodgett trough,
    e) controlling the surface pressure of the dioctadecyldimethylammonium halide solution using barriers mounted on the Langmuir-Blodgett trough,
    f) affixing a substrate to a dipping arm of the Langmuir-Blodgett trough and bringing the substrate into contact with the surface of the dioctadecyldimethylammonium halide solution, and
    g) separating the substrate from the dipping arm.

2. The method according to claim 1, wherein the dispersant is selected from the group consisting of ethanol, methanol, acetone, and mixtures thereof.

3. The method according to claim 1, wherein the dispersant is added in an amount of 0.06 to 20 parts by volume, based on 100 parts by volume of the dilute solution of vanadium pentoxide nanowires.

4. The method according to claim 1, wherein the dilute solution of vanadium pentoxide nanowires is an aqueous solution of 1 ml of the solution of vanadium pentoxide nanowires prepared by a sol-gel method in 200 to 2,000 ml of water.

5. The method according to claim 1, wherein the dioctadecyldimethylammonium halide is dioctadecyldimethylammonium chloride, dioctadecyldimethylammonium bromide, or dioctadecyldimethylammonium iodide.

6. The method according to claim 1, wherein the organic solvent is selected from the group consisting of chloroform, chlorobenzene, dichlorobenzene, and mixtures thereof.

7. The method according to claim 1, wherein the dilute solution of the dioctadecyldimethylammonium halide has a concentration of 0.05 to 10 mg/ml.

8. The method according to claim 1, wherein the dioctadecyldimethylammonium halide solution is applied using a Hamiltonian syringe.

9. The method according to claim 1, wherein the surface pressure is adjusted to 25 to 40 mN/m.

10. The method according to claim 1, wherein the substrate is a surface-patterned polymer stamp.

11. The method according to claim 10, wherein the polymer is polydimethylsiloxane.

12. The method according to claim 1, wherein the plane of the substrate is brought into contact with the surface of the dioctadecyldimethylammonium halide solution so as to be parallel to each other.

13. The method according to claim 1, wherein the plane of the substrate is brought into contact with the surface of the dioctadecyldimethylammonium halide solution so as to be perpendicular to each other.

14. The method according to claim 13, wherein after the substrate plane is dipped in a direction perpendicular to the surface of the dioctadecyldimethylammonium halide solution, the barriers are maximally opened and the substrate is separated from the dioctadecyldimethylammonium halide solution.

15. The method according to claim 14, wherein the surface of the dioctadecyldimethylammonium halide solution is covered with gauze to remove a film of the dioctadecyldimethylammonium halide formed at the interface between the dioctadecyldimethylammonium halide solution and air before the barriers are opened.

16. The method according to claim 1, further comprising the step of washing the substrate (or the stamp) with water or ethanol and blowing the surface of the substrate (or the stamp) with nitrogen gas, after step f).

17. The method according to claim 1, further comprising the step of heating the substrate at a temperature of 60-70° C. for 3-10 minutes, after step g).

18. The method according to claim 10, wherein the film of the vanadium pentoxide nanowires bound to the surface of the patterned polymer layer is transferred to another substrate by micro-contact printing.

19. A film of vanadium pentoxide nanowires with improved alignment, which is produced by the method according to claim 1.

* * * * *